(12) United States Patent
Eisenfeld

(10) Patent No.: US 11,448,811 B2
(45) Date of Patent: Sep. 20, 2022

(54) PROJECTOR CONFIGURATION WITH SUBDIVIDED OPTICAL APERTURE FOR NEAR-EYE DISPLAYS, AND CORRESPONDING OPTICAL SYSTEMS

(71) Applicant: LUMUS LTD., Ness Ziona (IL)

(72) Inventor: Tsion Eisenfeld, Ashkelon (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/093,772

(22) Filed: Nov. 10, 2020

(65) Prior Publication Data
US 2021/0055466 A1 Feb. 25, 2021

Related U.S. Application Data

(62) Division of application No. 16/411,197, filed on May 14, 2019, now Pat. No. 10,830,938.

(60) Provisional application No. 62/670,886, filed on May 14, 2018.

(51) Int. Cl.
*G02B 6/35* (2006.01)
*H04N 13/00* (2018.01)
*F21V 8/00* (2006.01)

(52) U.S. Cl.
CPC ........... *G02B 6/003* (2013.01); *G02B 6/0035* (2013.01)

(58) Field of Classification Search
CPC ....... G02B 6/003; G02B 6/0035; G02B 6/005
USPC .......................................................... 385/33
See application file for complete search history.

(56) References Cited

U.S. PATENT DOCUMENTS

| 2,329,001 | A | | 9/1943 | Robinson | |
|---|---|---|---|---|---|
| 3,544,190 | A | | 1/1970 | Moorhusen | |
| 5,770,847 | A | * | 6/1998 | Olmstead | G06K 7/10702 235/454 |
| 5,999,836 | A | * | 12/1999 | Nelson | A61B 5/0091 250/339.02 |
| 6,829,095 | B2 | * | 12/2004 | Amitai | G02B 6/0055 359/630 |
| 7,457,040 | B2 | * | 11/2008 | Amitai | G02B 27/286 359/629 |
| 7,949,252 | B1 | * | 5/2011 | Georgiev | H04N 13/229 396/334 |
| 9,039,202 | B2 | * | 5/2015 | Huang | G03B 21/2033 353/94 |

(Continued)

FOREIGN PATENT DOCUMENTS

| FR | 1485692 A | 6/1967 |
|---|---|---|
| FR | 2617562 | 1/1989 |

*Primary Examiner* — Kaveh C Kianni
(74) *Attorney, Agent, or Firm* — Mark M. Friedman

(57) ABSTRACT

An optical system for displaying a projected image to an observer includes a light-guide optical element having two major parallel surfaces and configured for guiding illumination corresponding to a projected image collimated to infinity by internal reflection at the major parallel surfaces from a coupling-in region to a coupling-out region where at least part of the illumination is coupled out towards an eye of the observer, and a projector configuration associated with the coupling-in region of the light-guide optical element. The projector configuration includes a number of adjacent optical arrangements, each including collimating optics deployed for projecting a subset of the illumination. The adjacent optical arrangements cooperate to provide an entirety of the projected image to the coupling-out region.

12 Claims, 9 Drawing Sheets

(56) References Cited

U.S. PATENT DOCUMENTS

| | | |
|---|---|---|
| 2004/0084088 A1 | 5/2004 | Callies |
| 2005/0073577 A1* | 4/2005 | Sudo ............... H04N 13/31 348/51 |
| 2005/0180687 A1 | 8/2005 | Amitai |
| 2005/0225866 A1* | 10/2005 | Abu-Ageel .......... G02B 6/122 359/619 |
| 2006/0146518 A1* | 7/2006 | Dubin ............. G02B 27/0172 362/106 |
| 2006/0153518 A1* | 7/2006 | Abu-Ageel ...... G02B 27/0927 385/146 |
| 2007/0052929 A1 | 3/2007 | Allman et al. |
| 2007/0091445 A1 | 4/2007 | Amitai |
| 2008/0106775 A1 | 5/2008 | Amitai et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0316606 A1 | 12/2008 | Inoguchi et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0171660 A1 | 7/2010 | Shyr et al. |
| 2010/0290124 A1 | 11/2010 | Tohara |
| 2011/0050595 A1 | 3/2011 | Lunback et al. |
| 2011/0191690 A1 | 8/2011 | Hang et al. |
| 2011/0242661 A1* | 10/2011 | Simmonds ......... G02B 27/0101 359/567 |
| 2012/0062998 A1* | 3/2012 | Schultz ............ B29D 11/00663 359/630 |
| 2012/0179369 A1 | 7/2012 | Lapidot et al. |
| 2013/0170004 A1* | 7/2013 | Futterer ................... G02B 5/32 359/9 |
| 2013/0187836 A1 | 7/2013 | Cheng |
| 2013/0229717 A1 | 9/2013 | Amitai |
| 2013/0276960 A1 | 10/2013 | Amitai |
| 2013/0279017 A1 | 10/2013 | Amitai |
| 2014/0016051 A1* | 1/2014 | Kroll ...................... G02B 30/27 349/15 |
| 2014/0104665 A1* | 4/2014 | Popovich ................. G02B 5/32 359/15 |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2015/0138451 A1 | 5/2015 | Amitai |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0207990 A1* | 7/2015 | Ford ...................... G02B 13/06 348/262 |
| 2015/0247976 A1* | 9/2015 | Abovitz ................. G06F 3/0487 385/37 |
| 2015/0277127 A1 | 10/2015 | Amitai |
| 2015/0293360 A1 | 10/2015 | Amitai |
| 2015/0309263 A2* | 10/2015 | Abovitz ............. G02B 27/0093 385/37 |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0312913 A1 | 10/2016 | Thybo et al. |
| 2016/0341964 A1 | 11/2016 | Amitai |
| 2016/0349518 A1 | 12/2016 | Amitai et al. |
| 2017/0045744 A1 | 2/2017 | Amitai |
| 2017/0052376 A1 | 2/2017 | Amitai |
| 2017/0052377 A1 | 2/2017 | Amitai |
| 2017/0336636 A1 | 11/2017 | Amitai et al. |
| 2017/0357095 A1 | 12/2017 | Amitai |
| 2017/0363799 A1 | 12/2017 | Ofir et al. |
| 2018/0003862 A1 | 1/2018 | Benitez |
| 2018/0039082 A1 | 2/2018 | Amitai |
| 2018/0046859 A1* | 2/2018 | Jarven ................. G02B 6/0036 |
| 2018/0067315 A1 | 3/2018 | Amitai et al. |
| 2018/0101087 A1 | 4/2018 | Shinohara |
| 2018/0157057 A1* | 6/2018 | Gelberg ............. G03B 21/2006 |
| 2018/0210202 A1 | 7/2018 | Danziger |
| 2018/0267317 A1 | 9/2018 | Amitai |
| 2018/0275384 A1 | 9/2018 | Danziger et al. |
| 2018/0292592 A1 | 10/2018 | Danziger |
| 2018/0292599 A1 | 10/2018 | Ofir et al. |
| 2018/0372940 A1 | 12/2018 | Ishii et al. |
| 2018/0373039 A1 | 12/2018 | Amitai |
| 2018/0373115 A1 | 12/2018 | Brown et al. |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278547 A1 | 9/2020 | Singer |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0355924 A1 | 11/2020 | Dobschal |
| 2020/0371311 A1 | 11/2020 | Lobachinsky et al. |
| 2021/0003649 A1 | 1/2021 | Rasche et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |

\* cited by examiner

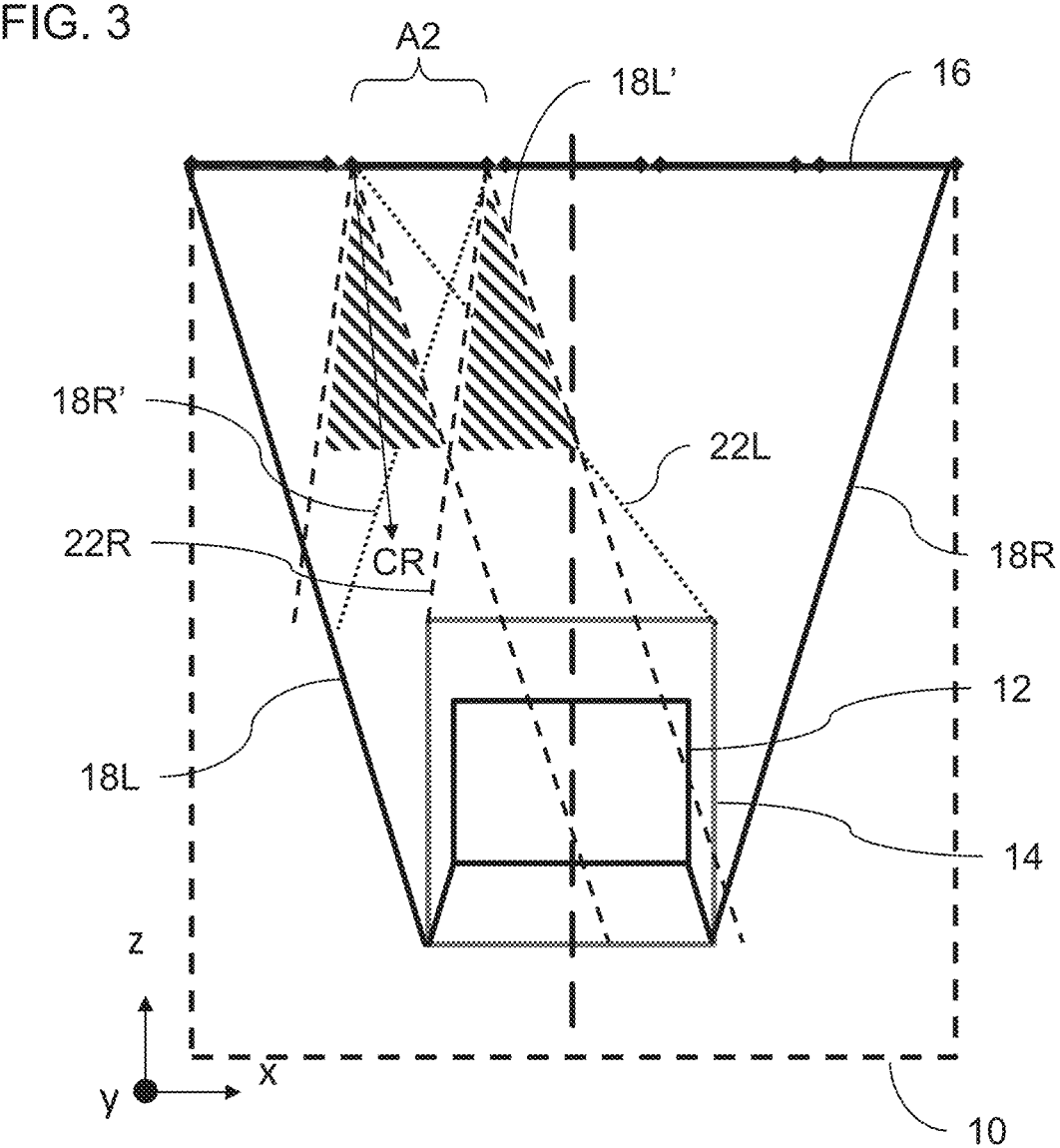

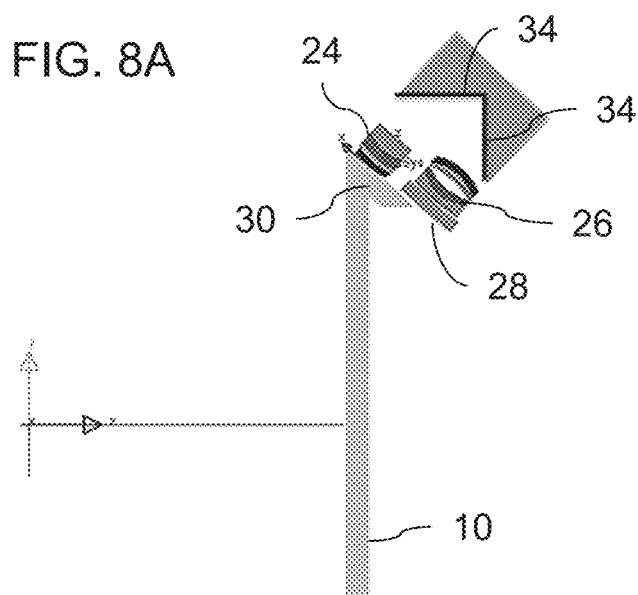
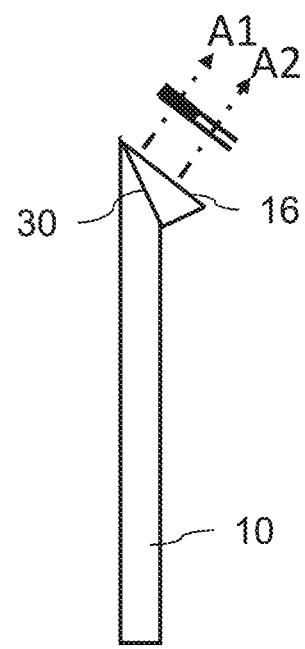
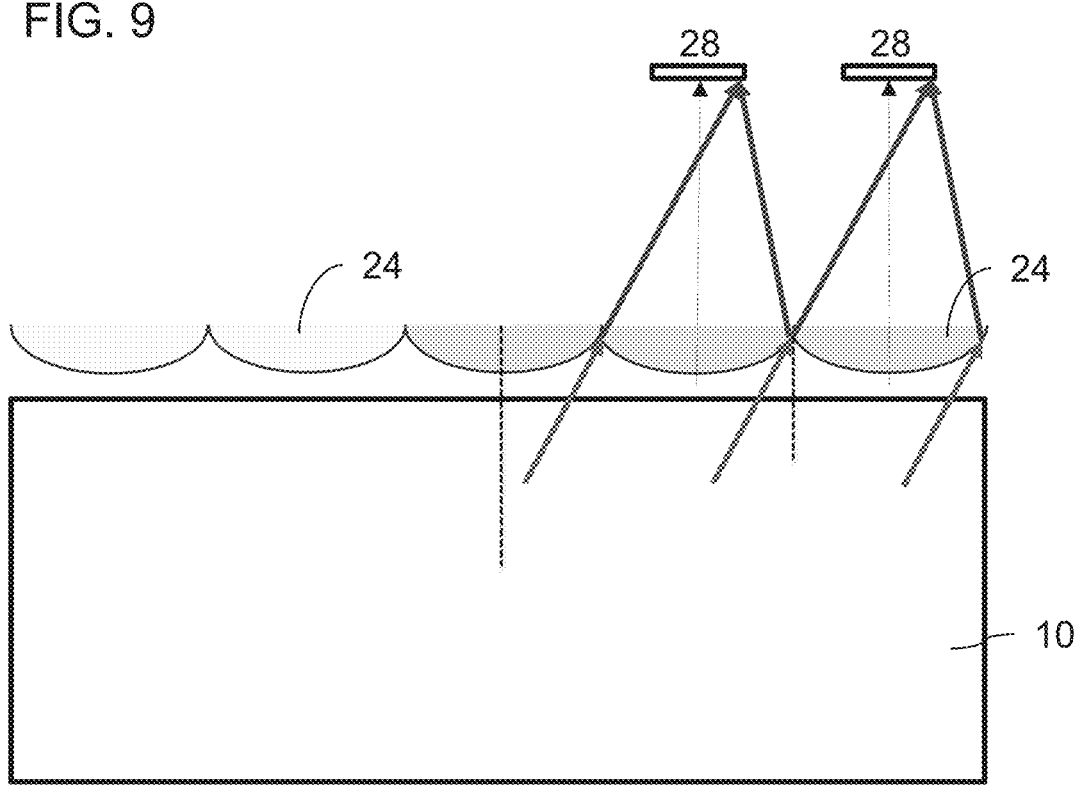

LOE Symmetry axis

LOE Symmetry axis

PROJECTOR CONFIGURATION WITH SUBDIVIDED OPTICAL APERTURE FOR NEAR-EYE DISPLAYS, AND CORRESPONDING OPTICAL SYSTEMS

FIELD AND BACKGROUND OF THE INVENTION

The present invention relates to virtual reality and augmented reality displays and, in particular, it concerns a projector configuration for such displays in which an overall optical aperture for projection of an image into a light-guide optical element is subdivided into a number of separate smaller apertures.

Many virtual reality and augmented reality displays employ a light-guide optical element (LOE) with two major parallel planar surfaces within which an image propagates by internal reflection. Illumination corresponding to a collimated image is introduced into the LOE at a coupling-in region, typically at one side, and propagates within the LOE by internal reflection until reaching a coupling-out region where it is coupled out of the LOE towards the viewer's eye. Coupling out of the illumination toward the eye may be by use of a set of obliquely angled partially reflective internal surfaces, such as described in U.S. Pat. Nos. 6,829,095, 7,021,777, 7,457,040, 7,576,916, or by use of one or more diffractive optical element, also as known in the art.

Although the LOE guides the illumination by internal reflection in one dimension, the dimension parallel to the plane of the LOE is not guided. As a result, in order to provide a full width of a desired field of view to the viewer, the in-plane dimension of the image projector introducing the image illumination into the coupling-in region needs to be relatively large. This results in a low f-number of the projector optics, often with f<1, and imposes corresponding strict requirements on the optical design and quality of the optical components.

SUMMARY OF THE INVENTION

The present invention provides a projector configuration and corresponding optical system for virtual reality and augmented reality head-up displays, particularly useful in near-eye displays, in which an optical aperture of an image projection system is partitioned (subdivided) into several zones, each with its own image generating and/or illumination subsystem.

According to certain implementations of the present invention, this may reduce the overall form factor of an optical engine, and/or may increase the optical performance while maintaining a relatively small number of optical components (lenses).

According to the teachings of the present invention there is provided, an optical system for displaying a projected image to an observer, the optical system comprising: (a) a light-guide optical element having two major parallel surfaces and configured for guiding illumination corresponding to a projected image collimated to infinity by internal reflection at the major parallel surfaces from a coupling-in region to a coupling-out region where at least part of the illumination is coupled out towards an eye of the observer; and (b) a projector configuration associated with the coupling-in region of the light-guide optical element, the projector configuration comprising a plurality of adjacent optical arrangements, each optical arrangement comprising collimating optics deployed for projecting a subset of the illumination, the adjacent optical arrangements cooperating to provide an entirety of the projected image to the coupling-out region.

According to a further feature of an embodiment of the present invention, each of the optical arrangements further comprises a spatial light modulator component generating a partial image corresponding to a part of the image.

According to a further feature of an embodiment of the present invention, the spatial light modulator components of the plurality of adjacent optical arrangements are provided by corresponding regions of a shared spatial light modulator device.

According to a further feature of an embodiment of the present invention, the collimating optics of each of the plurality of optical arrangements comprises at least a first lens and at least a second lens, and wherein the first lenses for the plurality of optical arrangements are integrally formed into a first lens array and the second lenses for the plurality of optical arrangements are integrally formed into a second lens array.

According to a further feature of an embodiment of the present invention, the projector configuration further comprises a baffle arrangement formed with a plurality of opaque baffles, the baffle arrangement being interposed between the first lens array and the second lens array so as to reduce cross-talk between the collimating optics of the plurality of optical arrangements.

According to a further feature of an embodiment of the present invention, the plurality of optical arrangements include respective beam deflecting optical elements so that all of the optical arrangements are arranged with parallel optical axes.

According to a further feature of an embodiment of the present invention, the beam deflecting optical elements comprise a plurality of beam deflecting prisms.

According to a further feature of an embodiment of the present invention, the collimating optics of all of the plurality of optical arrangements are identical.

According to a further feature of an embodiment of the present invention, each of the plurality of optical arrangements has an f-number of at least 2, and preferably at least 4.

According to a further feature of an embodiment of the present invention, the optical system is incorporated into a head-mounted support structure configured to support the optical system in spaced relation to an eye of the observer such that the eye views the light-guide optical element from a range of positions defining an eye-motion box, and wherein the coupling-out region is configured to deliver a field of view to the eye of the observer at all locations within the eye-motion box, and wherein adjacent ones of the optical arrangement project overlapping but non-identical portions of the field of view.

According to a further feature of an embodiment of the present invention, the subset of the illumination corresponds to an entirety of the image projected from a sub-region of the coupling-in region.

According to an alternative feature of an embodiment of the present invention, the subset of the illumination for at least one of the optical arrangements corresponds to only part of the image.

According to a further feature of an embodiment of the present invention, the coupling-out region comprises a plurality of partially-reflective surfaces deployed at an oblique angle to the major parallel surfaces.

According to a further feature of an embodiment of the present invention, the coupling-out region comprises at least one diffractive optical element associated with one of the major parallel surfaces.

There is also provided according to the teachings of an embodiment of the present invention, a projector configuration for delivering illumination corresponding to an image from an effective aperture of length L and width W via a light-guide optical element to an eye of a user, the projector configuration comprising at least three adjacent optical arrangements, each optical arrangement comprising: (a) a spatial light modulator component generating an output image corresponding to at least a part of the image; and (b) collimating optics deployed for projecting the output image as a collimated image via the light-guide optical element to an eye of the user, the collimating optics having an exit aperture, wherein the exit apertures of the optical arrangements cooperate to span the length L of the effective aperture, and to deliver into the light-guide optical element an entirety of the illumination required for displaying the image to the observer.

According to a further feature of an embodiment of the present invention, the output image for at least one of the optical arrangements corresponds to only part of the image to be displayed.

BRIEF DESCRIPTION OF THE DRAWINGS

The invention is herein described, by way of example only, with reference to the accompanying drawings, wherein:

FIG. 3 is a view similar to FIG. 2B illustrating the range of angles for which light from a given sub-aperture can reach the eye motion box;

FIG. 8A is a variant implementation of a display system similar to FIG. 6C illustrating the use of beam-folding reflectors to reduce the size of an optical arrangement;

FIG. 8B is a further variant implementation of a display system similar to FIG. 6C in which the optical aperture is subdivided in two dimensions;

FIG. 9 is a schematic representation of an optical architecture for implementing the present invention in which each sub-aperture is provided with the entire FOV of the projected image;

DESCRIPTION OF THE PREFERRED EMBODIMENTS

The present invention provides a projector configuration and corresponding optical system for virtual reality and augmented reality head-up displays, particularly useful in near-eye displays, in which an optical aperture of an image projection system is partitioned (subdivided) into several zones, each with its own image generating and/or illumination subsystem.

The principles and operation of projectors and optical systems according to the present invention may be better understood with reference to the drawings and the accompanying description.

Figure 1A:
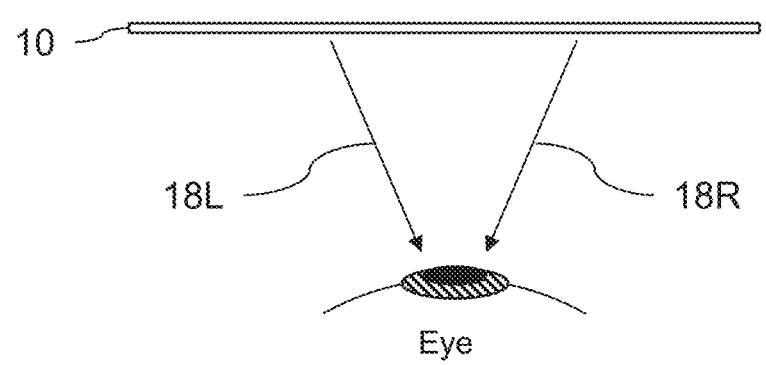
FIG. 1A is a schematic plan view of a field of view (FOV) projected from a light-guide optical element (LOE) towards an eye of an observer.
Figure 1B:
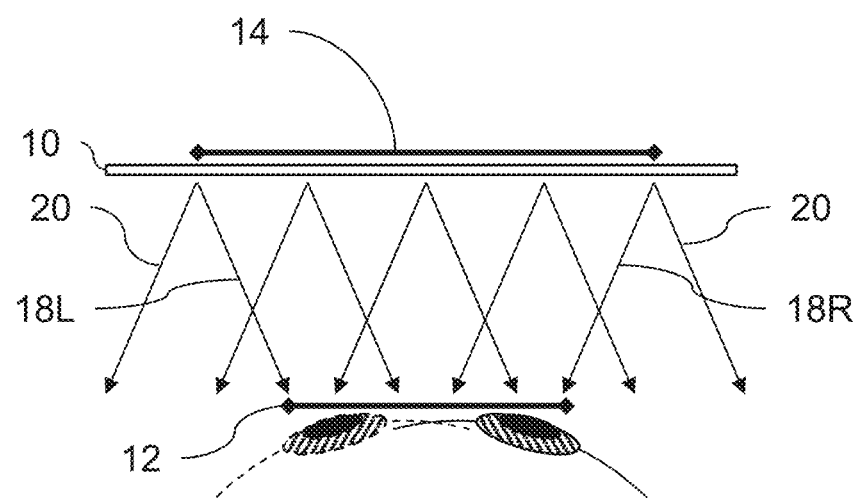
FIG. 1B is schematic plan view similar to FIG. 1A illustrating a distribution of light from an active area of the LOE in order to provide the field of view over the entirety of an eye motion box (EMB)
Figure 2A:
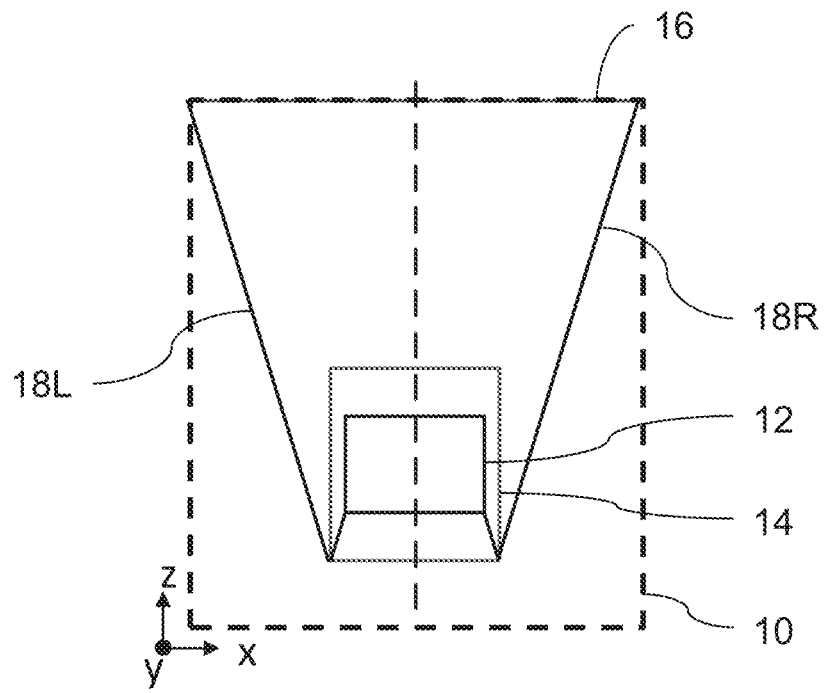
FIG. 2A is a schematic front view of an LOE illustrating the required length dimension of a coupling-in region of the LOE in order to provide the full FOV to the EMB.

By way of introduction, referring to FIGS. 1A, 1B and 2A, a display based on a light-guide optical element (LOE) 10 is typically designed to provide the full field of view from a right-most ray 18R to a left-most ray 18L to the eye of the viewer over the entirety of an "eye motion box" (EMB) 12 corresponding to the acceptable range of eye positions. FIG. 1A illustrates the field of view that is provided to the eye in a central position, while FIG. 1B shows the required dimension of the display in the plane of the LOE (the "active area" 14 of the LOE 10) in order to provide all parts of the image to the entire EMB 12. The conventional approach typically provides all ray angles of the image projected from all parts of the LOE display area, although it will be noted that much of the image (rays 20) from the peripheral margins of the display area actually falls outside the EMB 12, and is therefore not in fact required.

The required aperture dimension at the coupling-in aperture of the LOE can be derived by tracing the light rays in the opposite direction, from the EMB via the coupling-out arrangement to the wave-guide entrance aperture. A trace of the most extreme angle rays from the eye box, expanding up towards the entrance aperture, is shown in FIG. 2A. The resulting required aperture dimension depends on the EMB size, the field of view, eye-to-entrance aperture distance and the refractive index.

The result of this geometry is that the system has a large effective optic aperture 16 in the plane of the LOE. This together with the desire to use short focal length in order to implement a compact projector arrangement results in a low f-number, with consequent demanding optical requirements and reduction in image quality compared to a higher f-number system.

To address this issue, the present invention provides a projector, an optical system and a method for projecting an image in which the optical aperture 16 through which the image is coupled-in to the LOE is subdivided into a plurality of separate apertures, shown here as A1-A5, each having an independent projecting arrangement which projects the corresponding portion of the field of view. This is illustrated schematically in FIG. 2B.

Thus, regarding the optical system, in general terms, the optical system includes a light-guide optical element (LOE) 10 having two major parallel surfaces and configured for guiding illumination corresponding to a projected image collimated to infinity by internal reflection at the major parallel surfaces from a coupling-in region (effective aperture 16) to a coupling-out region (active area 14) where at least part of the illumination is coupled out towards an eye of the observer, located at an eye motion box (EMB) 12. A projector configuration 23 is associated with the coupling-in region 16 of the light-guide optical element. The projector configuration 23 (FIGS. 6B and 6C) includes a plurality of adjacent optical arrangements or "subsystems" 25, each having its own collimating optics deployed for projecting a subset of the illumination required from the overall effective aperture 16. The adjacent optical arrangements cooperate to provide an entirety of the projected image to the coupling-out region.

In a basic implementation, each optical subsystem can project the entire FOV from each sub-aperture. However, as pointed out above with reference to FIG. 1B, this is wasteful, as much of the illumination from the lateral zones falls outside the EMB and is not needed. More preferably, when dividing the wave guide entrance aperture into several smaller zones, the field of view is also subdivided over the different zones so that each zone projects only the part of the field of view which is relevant for illuminating the EMB.

The determination of the field of view for each optical aperture is illustrated in FIG. 3 for an arbitrarily chosen aperture A2 as shown. Specifically, there is shown a front view of LOE 10 generally similar to FIG. 2B and similarly labeled. The range of angles for which light from aperture A2 could reach the EMB 12 can be found by tracing a ray 22L from the left side of aperture A2 to the right extremity of the active area 14, corresponding to the furthest left part of the field which could reach the EMB, and a ray 22R from the right side of aperture A2 to the left extremity of the active area 14, corresponding to the furthest right part of the field which could reach the EMB from aperture A2. The relevant range of angles is of course also limited by the field of view (FOV) of the image, spanning angles from ray 18R' to ray 18L'. In the case of the left side of the field, line 22L lies outside the FOV, so all rays up to the left edge of the FOV 18L' need to be displayed from aperture A2. On the right side of the field, line 22R, defining the geometrical limit of rays that can reach the EMB, excludes part of the FOV, so that only pixels with angles from 22R inwards need to be displayed, and the remainder of the field between 22R and 18R' is unnecessary. In order to optimize performance of the collimating optics, it is preferable to define the projector arrangement according to an adjusted chief ray (CR) corresponding to the middle of the projected field for that projector, which will be different for each projector.

It will be immediately apparent that the present invention provides a number of advantages compared to an equivalent display system employing a conventional projector to span the entire effective aperture 16. Specifically, by subdividing the aperture into multiple zones of smaller dimensions, the f-number of the optical arrangements is increased by a factor of (dtotal aperture/dzone) where dtotal aperture is the maximum dimension of the overall effective aperture, corresponding to a length L of the coupling-in region, and dzone is the maximum dimension of the separate optical arrangement exit aperture. The f-number of the individual optical arrangements is preferably at least 2, and more preferably at least 4, with certain particularly preferred implementations having an f-number of at least 5. This compares to projectors for conventional LOE-based displays which typically have an f-number of less than 1, and often closer to ½. This increase in f-number leads to a corresponding relaxation of requirements on the properties of the optical arrangements, facilitating high quality image projection using relatively simple and low-cost optical components.

Figure 4A:
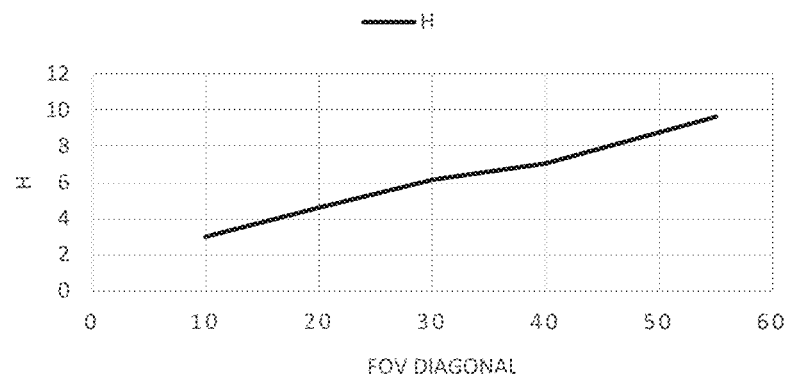
FIGS. 4A and 4B are graphs illustrating examples of a recommended number of sub-apertures as a function of image angular field of view for a top-down and a side-injected LOE configuration, respectively.
Figure 4B:
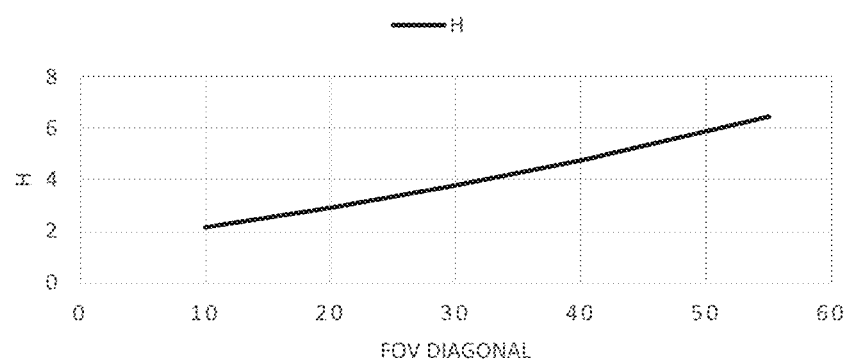
Figure 5:
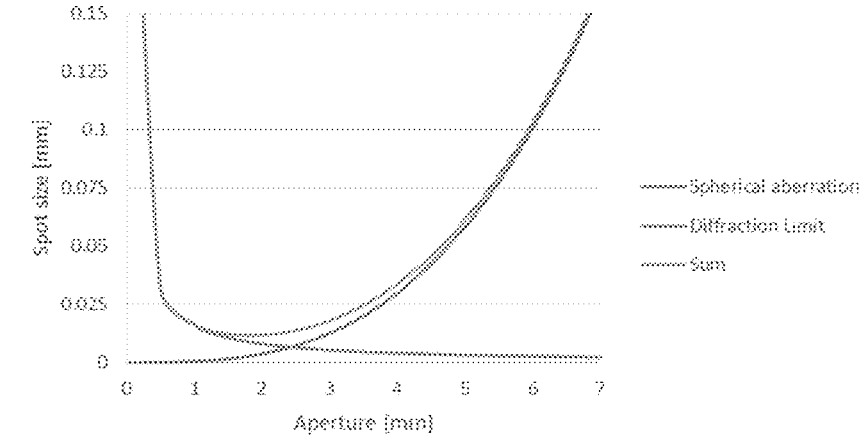
FIG. 5 is a graph illustrating conflicting considerations for selecting a partition aperture size for certain implementations of the present invention.

The graphs of FIGS. 4A and 4B show an estimation of what number of subdivisions (or "partitions" or "zones") H is believed to be optimal in the case of a 16/9 ratio FoV with various angular sizes (with an EMB of 8×10 mm). These values are merely illustrative suggestions, and good results may also be achieved using either more or fewer subdivisions. When designing a system with small dimensions, such as for a near-eye display, advantages of subdividing the aperture in terms of increased f-number and reducing spherical aberration need to be balanced against the impact of the diffraction limit on spot size, as illustrated schematically in FIG. 5. Acceptable and/or optimal ranges for aperture size can readily be selected by one ordinarily skilled in the art based on these considerations.

It should be noted that the subdivision of the projector aperture into zones need not be performed with equal subdivisions. For example, considering that a small part of the FOV and a smaller proportion of image intensity is required per unit area in the peripheral apertures, it may be preferred to employ larger apertures towards the periphery of the overall aperture. On the other hand, certain particularly preferred implementations employ identical apertures and identical optical arrangements for all of the optical subsystems, thereby achieving simplification of the structure.

Partitioning of the aperture can be implemented using a range of different optical architectures for the collimating optics module responsible for collimating the light beams exiting from a micro-display into the LOE entrance (coupling-in) aperture. In addition to the Polarizing Beam Splitters collimating optics architecture described for example in U.S. Pat. No. 8,643,948, the increased f-number and reduced optical requirements of the subdivided aperture approach facilitate implementation of a compact architecture based on refractive lenses. The use of refractive lenses allows the lens to be located on or right after the wave guide entrance aperture, thereby avoiding the further expansion of the field which occurs over the distance from the waveguide entrance to the collimating optics in a reflective optics PBS-based design. The proximity of the lens to the aperture allows the use of a lens which is roughly equal in size to the corresponding optical aperture of the assigned zone, resulting in a much more compact design than reflective optics implementation.

Figure 6A:
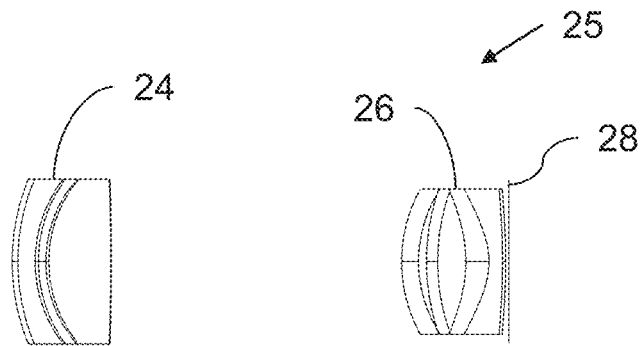
FIG. 6A is a schematic side view of a lens arrangement suitable for use in certain implementations of the present invention.
Figure 6B:
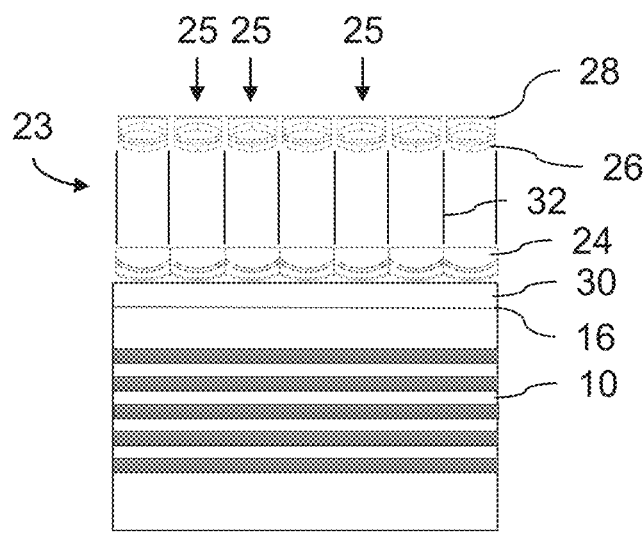
FIG. 6B is a schematic front view of a display system employing a plurality of the lens arrangements of FIG. 6A associated with an LOE.
Figure 6C:
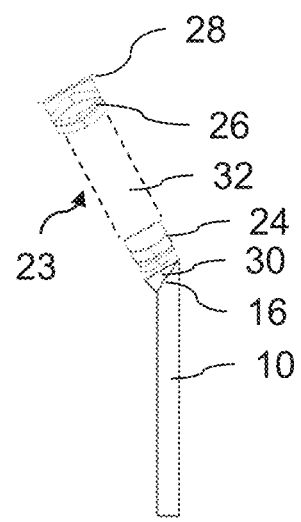
FIG. 6C is a schematic side view of the display system of FIG. 6B.

The less-stringent optical performance requirements resulting from the subdivision of the overall aperture and the consequent relatively high f-number for each optical arrangement 25 allows the use of relatively simple collimating optics while preserving high quality image output. For example, certain implementations of the invention employ collimating optics for each optical arrangement 25 which includes 4 optical elements arranged as two doublets, such as for example a Petzval lens. An example of such an arrangement is shown in FIG. 6A as a single optical arrangement 25, with a first doublet 24 and a second doublet 26, the second doublet being aligned with a spatial light modulator component 28. FIGS. 6B and 6C illustrate schematically a full optical system including an array of, in this example, seven optical arrangements as in FIG. 6A together spanning the coupling-in effective aperture of an LOE 10. Each sub-aperture is preferably rectangular so that the juxtaposed sub-apertures form a substantially continuous effective aperture. Coupling-in is achieved here in this non-limiting example by use of a coupling prism 30 which presents a correctly inclined coupling in surface for introducing the image illumination into the LOE.

According to one particularly preferred implementation, the juxtaposed lenses or lens assemblies 24 are integrated into a first lens array which, for device assembly purposes, functions as a single element. Similarly, the juxtaposed lenses or lens assemblies 26 are integrated into a second lens array which, for device assembly purposes, functions as a single element. The lens arrays may advantageously be produced by a molding process, rendering the structure particularly low cost and easy to assemble. Where each lens array provides a doublet lens of the corresponding lens assembly, the component lenses can be molded as two separate arrays which are subsequently assembled to form a doublet array. Alternatively, a two-component molding process may be used to directly produce the doublet lens array, using techniques known in the art of lens manufacture. Preferably, a baffle arrangement formed with a plurality of opaque baffles 32 is interposed between first lens array 24 and second lens array 26 so as to reduce cross-talk between the collimating optics of the plurality of optical arrangements. The baffle arrangement may also serve as a spacer to define and maintain the required spacing between the lens arrays.

It should be appreciated that the aforementioned refractive lens arrangement is only one non-limiting example, and that the present invention can be implemented with a wide range of other lens types and implementations, including but not limited to, spherical, aspherical or freeform refractive lenses formed from glass or plastic, diffractive lenses, Fresnel lenses, reflective lenses, and any combination of the above.

According to a further preferred feature, which may be implemented as part of the above lens array construction or with separate optical arrangements, the spatial light modulator components of a plurality of adjacent optical arrangements are provided by corresponding regions of a shared spatial light modulator device. In some cases, the entire array of spatial light modulator components may be provided by a single elongated spatial light modulator extending the length of the array. In the case of a light emitting spatial light modulator, such as an OLED display element, a backlit LCD panel, a micro LED display or a digital light processing (DLP) chip, the display surface can be directly aligned with the optical arrangements for minimum weight and bulk. If it is desired to use a reflective spatial light modulator, such as an LCOS chip, a beam splitter cube block is typically interposed between the collimating optics and the modulator to allow delivery of illumination to the modulator surface, as is known in the art.

Figure 7:
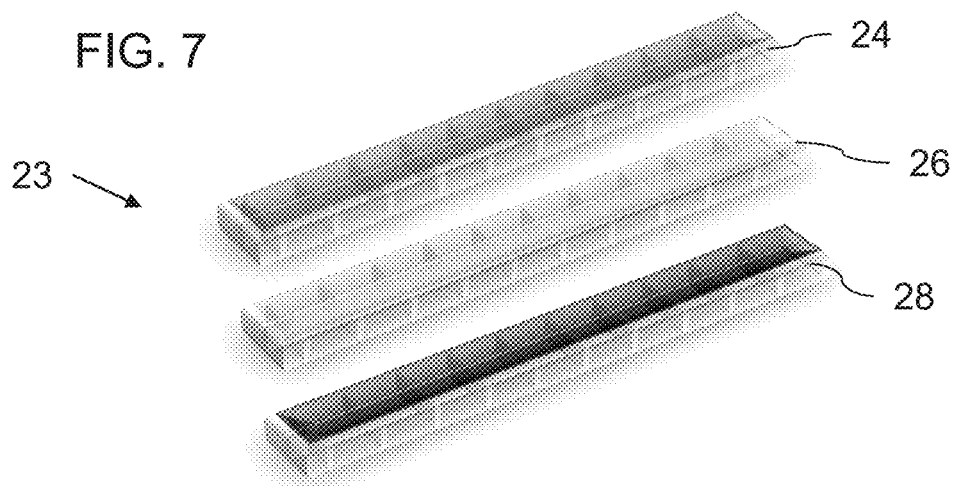
FIG. 7 is a schematic isometric view of components of the display system of FIG. 6B implemented as lens arrays for convenient assembly.

FIG. 7 represents schematically component modules of a first lens array 24, a second lens array 26 and an elongated spatial light modulator 28 ready for assembly together with a baffle arrangement (not shown) and an LOE (not shown) to form an optical system according to the present invention.

Turning to FIG. 8A, there is shown a variant implementation of the arrangement of FIG. 6C where one or more reflector 34 is provided to fold the optical path between the first and second lens arrays 24, 26, thereby facilitating a more compact implementation as shown. In the example illustrated here, a pair of reflectors 34 fold the path twice through 90 degrees, allowing the optical components and spatial light modulator to be mounted on a common plane, for example, an extension of the coupling-in prism 30.

Turning to FIG. 8B, although the subdivision of the aperture 16 has thus far been illustrated only in the length dimension L, parallel to the plane of the LOE major surfaces, in certain cases, it may additionally be advantageous to subdivide the coupling-in aperture 16 in a perpendicular direction, corresponding to the two zones A1 and A2 illustrated in FIG. 8B. In this case, the FOV and chief rays for each subdivision across the aperture are typically identical, corresponding to the entire FOV in that dimension.

Turning now to FIGS. 9-12, a number of options will be discussed regarding the FOV projected by each of the optical arrangements from each of the aperture zones, and the geometry of the projection arrangement. FIG. 9 illustrates schematically a case where each of the optical arrangements projects the entirety of the FOV. (In this drawing and each of the following drawings, only selected rays indicative of the optical performance for two sample aperture zones are shown for simplicity of presentation.) In this case, all of the optical arrangements are deployed with their optical axes parallel, and each display generates an image corresponding to the full image to be displayed. This option may be preferred in a wide range of circumstances due to its structural simplicity and ease of alignment. It is however energetically inefficient, as explained above with reference to FIG. 1B, since much of the projected illumination is not directed towards the EMB and is therefore wasted. Additionally, it requires each collimating optics to handle a relatively wide angular FOV.

Figure 10A:
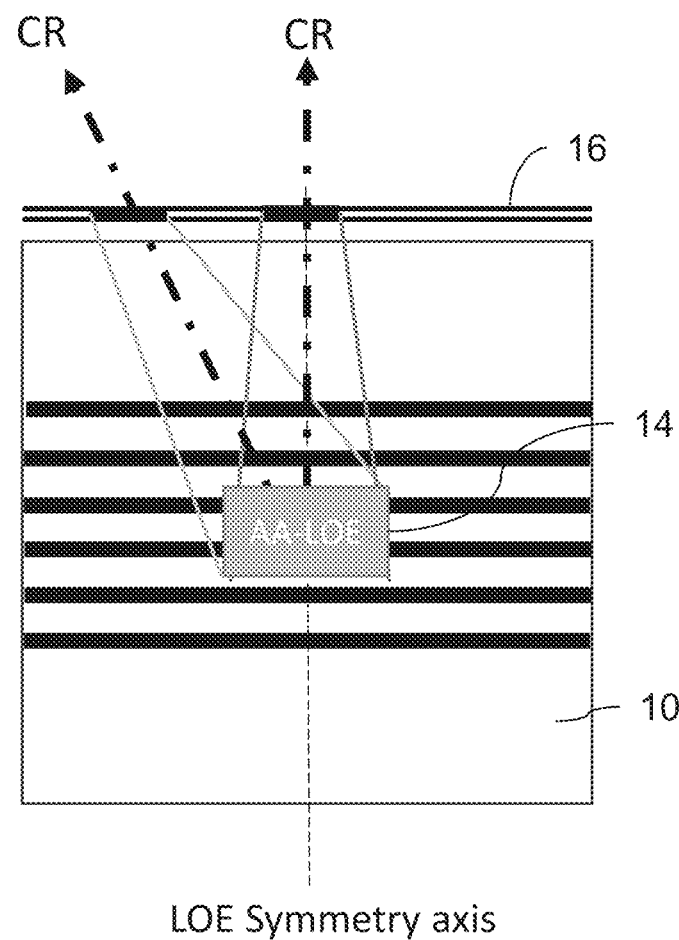
FIG. 10A is a schematic front view of an LOE illustrating the orientation of the chief ray of two different sub-apertures, where each aperture projects only the parts of the image that fall within the EMB.
Figure 10B:
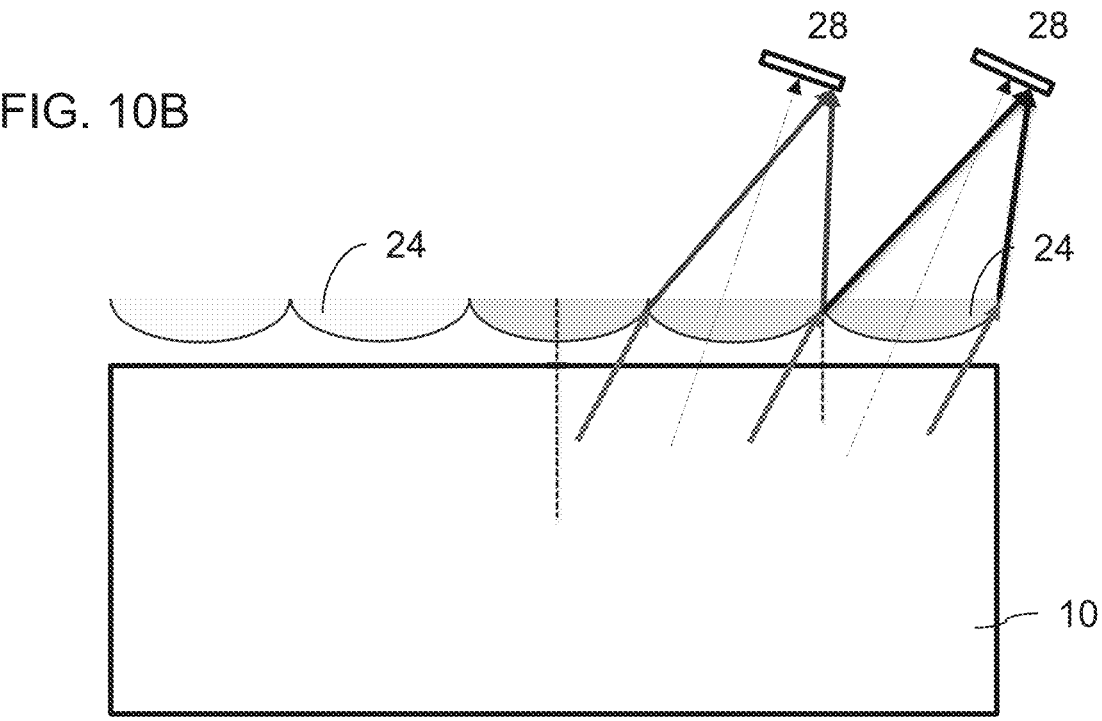
FIG. 10B is a schematic representation of an optical architecture for implementing the present invention in which an optical arrangement associate with each sub-aperture projects a partial image aligned with the chief ray for that sub-aperture.

FIGS. 10A and 10B illustrate an alternative approach, based on the analysis described above with reference to FIG. 3 according to which each optical arrangement projects only a partial image corresponding to a part of the overall image to be displayed for which the pixels are visible from the corresponding aperture at some location within the EMB. This reduces energy wastage, and reduces the FOV to be projected by at least some of the optical arrangements. To optimize performance of the optical arrangement, each optical arrangement is preferably aligned so that the new chief ray CR corresponding to the center of the field projected by that arrangement lies on the optical axis of the collimating optics. This results in a construction as illustrated schematically in FIG. 10B, wherein each optical arrangement is oriented at a different angle. While this construction offers the aforementioned advantages over FIG. 9 of improved energy efficiency and reduced FOV requirements from the optical arrangements, the non-parallel deployment of the different projector subsystems may in some cases result in design complexity and engineering challenges.

Figure 11A:
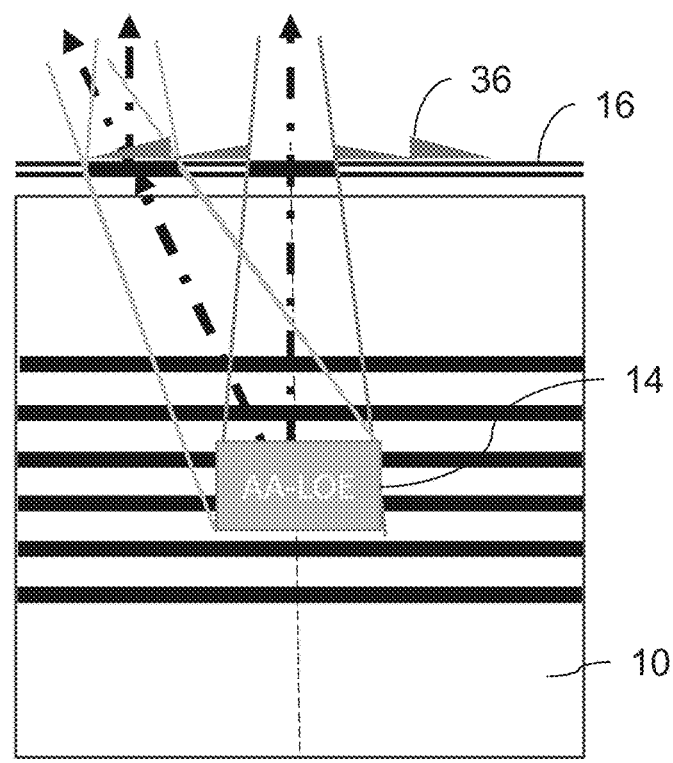
FIGS. 11A and 11B are views similar to FIGS. 10A and 10B, respectively, illustrating the use of beam deflecting optical elements to redirect the chief rays of each sub-aperture.
Figure 11B:
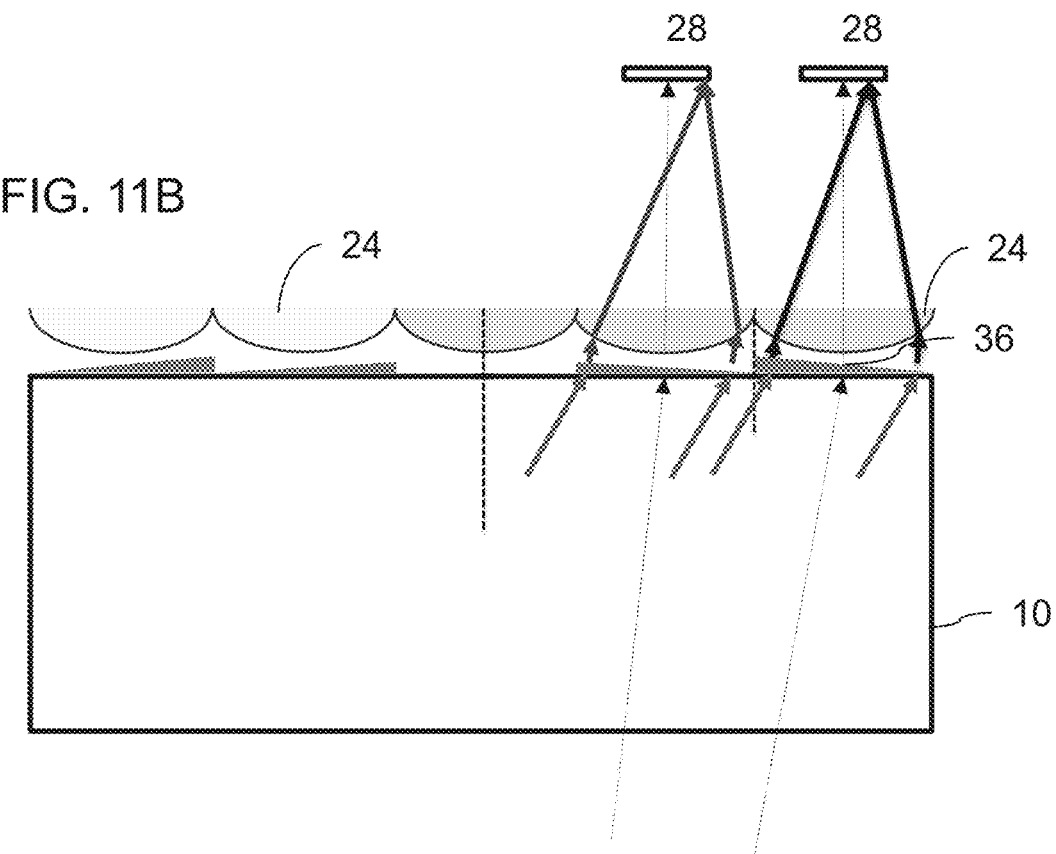
Figure 12:
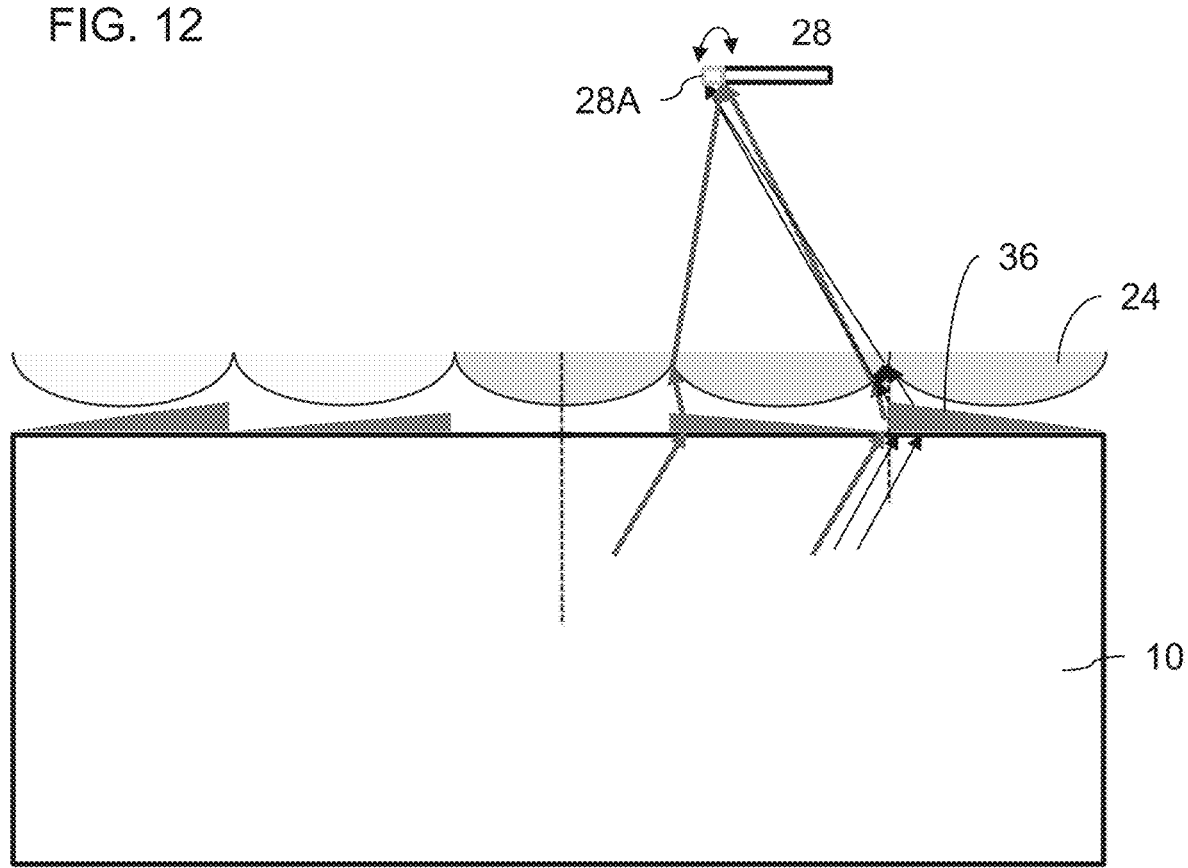
FIG. 12 is a view similar to FIG. 11B illustrating use of peripheral regions of a spatial light modulator to provide compensatory image output.

FIGS. 11A and 11B illustrate schematically a modified device conceptually similar to that of FIGS. 10A and 10B but modified by addition of respective beam deflecting optical elements 36 deployed to deflect the illumination path for each sub-projector so that all of the optical arrangements are arranged with parallel optical axes. In the particularly preferred implementation illustrated here, the beam deflecting optical elements are a plurality of beam deflecting wedge prisms 36, each with a wedge angle chosen to correct the inclination of the corresponding chief beam of the aperture. Optionally, the deflecting prism may be implemented as a doublet of two prisms to correct for chromatic dispersion. Alternatively, dispersion can be handled via digital correction of the projected image by displacing the color separations by a compensating offset. It should be noted that other types of beam deflecting optical elements may also be used for implementing this aspect of the present invention, including but not limited to: direction turning film and diffractive optical elements. Where one of the optical arrangements lies on the optical axis of symmetry of the LOE (typically when there are an odd number of apertures), the central optical arrangement typically does not require a beam deflecting optical element.

Throughout the above-described implementations of the present invention, care should be taken to minimize gaps or obscurations at the junctions between adjacent lenses defining the adjacent partial apertures so as to avoid or minimize dark lines and other edge-related distortions. Various design choices, such as the use of high refractive index materials or the use of Fresnel lenses allow implementations with relatively flat or large-radius curvature of the outer surfaces, facilitating extending the optical performance up to the seam between the apertures, and minimizing any "black line" effect.

In certain situations, particularly where a beam deflecting optical element 36 is used, and the exit apertures 24 of the optical arrangements are somewhat set back from the beam deflecting optical elements, certain beam directions adjacent to the seams may be deflected sufficiently by the beam deflector 36 of one optical arrangement to enter the collimating optics 24 of an adjacent optical arrangement. (Here, as elsewhere in the description, the optical properties are analyzed by tracing beams in a reverse direction through the system, as if originating at the EMB and propagating into the projectors.) Although such stray beams could be eliminated by use of baffles or the like, that would still result in black lines in those regions of the display. This effect is illustrated schematically in FIG. 12.

To address this issue, it is noted that the location of the stray rays from the adjacent beam deflecting optical element arriving at the plane of the spatial light modulator 28 lie outside the field of view of the projected image for that optical arrangement. As a result, according to a further aspect of the present invention, a marginal region 28A of the spatial light modulator element outside the region 28 used for projecting the primary partial image of the sub-projector is actuated to generate a portion of the image, disjointed from the primary partial image, which supplies the correct image information to ray paths passing through the marginal region of the adjacent beam deflecting optical element. This strip of image, outside the direct FOV of the collimating optics, may be generated on both sides of the display.

The various embodiments of the present invention may be implemented in a wide range of contexts and applications. According to one particularly preferred but non-limiting set of implementations, the optical system is incorporated into a head-mounted support structure, such as an eyeglasses frame configuration or a helmet visor, that supports the optical system in spaced relation to an eye of the observer such that the eye views the light-guide optical element from a position within a range of positions defining an eye-motion box. In some cases, two such systems are provided to provide images to both eyes of the viewer. The coupling-out region is configured to deliver a field of view to the eye of the observer at all locations within the eye-motion box. The multiple optical arrangements cooperate to provide this full field of view, with each either projecting the entire FOV as per FIG. 9 or projecting partial images with overlapping but non-identical portions of the field of view as per FIGS. 10A-11B.

The present invention is applicable to all display devices where the projector delivers illumination corresponding to an image, typically collimated to infinity, from an effective aperture of length L and width W via a light-guide optical element to an eye of a user, where the projector has at least three adjacent optical arrangements, each optical arrangement including a spatial light modulator component generating a projected image corresponding to at least part of the image, and collimating optics deployed for projecting the projected image as a collimated image via the light-guide optical element to an eye of the user. Exit apertures of all of the optical arrangements cooperate to span the length L of the effective aperture, and to deliver into the light-guide optical element an entirety of the illumination required for displaying the image to the observer.

Figure 2C:
FIG. 2C is a schematic side view of the LOE of FIG. 2B illustrating a coupling-out region having a plurality of partially-reflective surfaces deployed at an oblique angle to the major parallel surfaces.
Figure 2B:
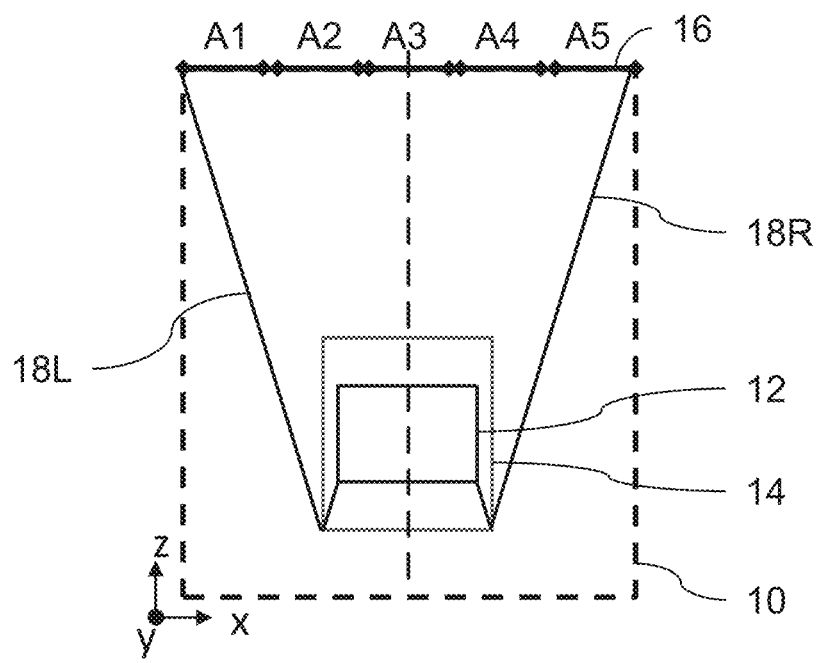
FIG. 2B is a view similar to FIG. 2A illustrating schematically the subdivision of the coupling-in region into sub-apertures according to an aspect of the present invention.
Figure 2D:
FIG. 2D is a schematic side view of the LOE of FIG. 2B illustrating a coupling-out region having a diffractive optical element.

Embodiments of the present invention are applicable to a wide range of applications, particularly with asymmetric apertures such as a coupling-in region of an LOE, and for all types of LOE technology including, but not limited to, LOE's which include a coupling-out region with a plurality of partially-reflective surfaces 13 deployed at an oblique angle to the major parallel surfaces, as shown in FIG. 2C, and LOE's which include a coupling-out region with at least one diffractive optical element 15 deployed for coupling out image illumination towards the eye of the viewer, as shown in FIG. 2D.

It will be appreciated that display devices employing the optical device of the present invention will include additional electronic components such as at least one processor or processing circuitry to drive the display device, all as is known in the art. Where different spatial light modulators, or different regions of a single spatial light modulator, are driven in parallel to generate similar images, or are driven to generate different partial images, each aligned with the corresponding collimating optics, the necessary driver circuitry, whether implemented as dedicated hardware, an ASIC, a general purpose processor operating under control of suitable software, or any hardware/software/firmware combination, will be readily understood by a person having ordinary skill in the art. Other hardware components, such as power supplies, communication subsystems, illumination subsystems, sensors, input devices etc. are typically added, all in accordance with the device design and intended application, as will be clear to a person having ordinary skill in the art.

It will be appreciated that the above descriptions are intended only to serve as examples, and that many other embodiments are possible within the scope of the present invention as defined in the appended claims.

What is claimed is:

1. A projector configuration for delivering illumination corresponding to an image from an effective aperture of length L and width W via a light-guide optical element to an eye of a user, the projector configuration comprising:
   at least three adjacent optical arrangements, each optical arrangement comprising:
   (a) a spatial light modulator component generating an output image corresponding to at least a part of the image; and
   (b) collimating optics deployed for projecting said output image as a collimated image having a central ray direction via the light-guide optical element to an eye of the user, said collimating optics having an exit aperture,
   wherein said exit apertures of said optical arrangements cooperate to span the length L of the effective aperture, and to deliver into the light-guide optical element an entirety of the illumination required for displaying the image to the observer,
   and wherein said collimating optics of said at least three adjacent optical arrangements have parallel central axes, the projector configuration further comprising a plurality of beam deflecting optical elements deployed to deflect said output image from a plurality of said adjacent optical arrangements to that said central ray directions converge.

2. The projector configuration of claim 1, wherein said output image for at least one of said optical arrangements corresponds to only part of the image to be displayed.

3. The projector configuration of claim 1, wherein each of said beam deflecting optical elements is a prism.

4. The projector configuration of claim 1, wherein said spatial light modulator components of said at least three adjacent optical arrangements are provided by regions of a single spatial light modulator.

5. The projector configuration of claim 1, wherein said collimating optics of each of said at least three adjacent optical arrangements comprises at least a first lens and at least a second lens, and wherein said first lenses for said at least three adjacent optical arrangements are integrally formed into a first lens array and said second lenses for said at least three adjacent optical arrangements are integrally formed into a second lens array.

6. The projector configuration of claim 1, wherein said collimating optics of all of said at least three adjacent optical arrangements are identical.

7. The projector configuration of claim 1, wherein each of said at least three adjacent optical arrangements has an f-number of at least 2.

8. The projector configuration of claim 1, wherein each of said at least three adjacent optical arrangements has an f-number of at least 4.

9. A projector configuration for delivering illumination corresponding to an image from an effective aperture of length L and width W via a light-guide optical element to an eye of a user, the projector configuration comprising:
   at least three adjacent optical arrangements, each optical arrangement comprising:
   (a) a spatial light modulator component generating an output image corresponding to at least a part of the image; and
   (b) collimating optics deployed for projecting said output image as a collimated image via the light-guide optical element to an eye of the user, said collimating optics having an exit aperture,
   wherein said exit apertures of said optical arrangements cooperate to span the length L of the effective aperture, and to deliver into the light-guide optical element an entirety of the illumination required for displaying the image to the observer,
   wherein said collimating optics of each of said at least three adjacent optical arrangements comprises at least a first lens and at least a second lens, and wherein said first lenses for said at least three adjacent optical arrangements are integrally formed into a first lens array and said second lenses for said at least three adjacent optical arrangements are integrally formed into a second lens array,
   and further comprising a baffle arrangement formed with a plurality of opaque baffles, said baffle arrangement being interposed between said first lens array and said second lens array so as to reduce cross-talk between said collimating optics of said at least three adjacent optical arrangements.

10. A projector configuration for delivering illumination corresponding to an image from an effective aperture of length L and width W via a light-guide optical element to an eye of a user, the projector configuration comprising:
    at least three adjacent optical arrangements, each optical arrangement comprising:
    (a) a spatial light modulator component generating an output image corresponding to at least a part of the image; and
    (b) collimating optics deployed for projecting said output image as a collimated image via the light-guide optical element to an eye of the user, said collimating optics having an exit aperture,
    wherein said exit apertures of said optical arrangements cooperate to span the length L of the effective aperture, and to deliver into the light-guide optical element an entirety of the illumination required for displaying the image to the observer,
    further comprising a light-guide optical element having two major parallel surfaces, wherein said at least three adjacent optical arrangements are optically couple to said light-guide optical element so as to introduce said output images into said light-guide optical element so as to propagate within said light-guide optical element by internal reflection at said major parallel surfaces to a coupling-out region where at least part of said illumination is coupled out towards the eye of the user,
    and wherein said length L of said effective optical aperture extends parallel to said major parallel surfaces.

11. The projector configuration of claim 10, wherein said coupling-out region comprises a plurality of partially-reflective surfaces deployed at an oblique angle to said major parallel surfaces.

12. The projector configuration of claim 10, wherein said coupling-out region comprises at least one diffractive optical element associated with one of said major parallel surfaces.

* * * * *